(12) United States Patent
Vinelli et al.

(10) Patent No.: US 11,172,289 B2
(45) Date of Patent: Nov. 9, 2021

(54) ACOUSTIC SYSTEM FOR DETECTING AND LOCATING LOW INTENSITY AND LOW FREQUENCY SOUND SOURCES AND RELATED LOCATING METHOD

(71) Applicant: LEONARDO S.p.A., Rome (IT)

(72) Inventors: Francesco Vinelli, Rome (IT); Annarita Di Lallo, Rome (IT)

(73) Assignee: LEONARDO S.p.A., Rome (IT)

( * ) Notice: Subject to any disclaimer, the term of this patent is extended or adjusted under 35 U.S.C. 154(b) by 0 days.

(21) Appl. No.: 17/045,695

(22) PCT Filed: Mar. 15, 2019

(86) PCT No.: PCT/IB2019/052128
§ 371 (c)(1),
(2) Date: Oct. 6, 2020

(87) PCT Pub. No.: WO2019/193440
PCT Pub. Date: Oct. 10, 2019

(65) Prior Publication Data
US 2021/0029448 A1 Jan. 28, 2021

(30) Foreign Application Priority Data

Apr. 6, 2018 (IT) .......................... 102018000004280
Oct. 18, 2018 (IT) .......................... 102018000009569

(51) Int. Cl.
*H04R 1/40* (2006.01)
*G01H 3/12* (2006.01)
(Continued)

(52) U.S. Cl.
CPC ............. *H04R 1/406* (2013.01); *G01H 3/125* (2013.01)

(58) Field of Classification Search
CPC ........ H04R 1/406; H04R 3/005; G01H 3/125; G01S 5/30; G10S 3/82; G10K 11/346
(Continued)

(56) References Cited

U.S. PATENT DOCUMENTS 6,288,973 B1* 9/2001 Joynes ...................... G01S 5/30
367/118
2013/0317669 A1* 11/2013 Jiang ......................... G01S 3/00
701/3
2016/0043771 A1 2/2016 Mohamadi

FOREIGN PATENT DOCUMENTS

JP 2010-25802 A 2/2010

OTHER PUBLICATIONS

International Search Report and Written Opinion of the International Searching Authority for International Patent Application No. PCT/IB2019/052128 dated Jun. 19, 2019, 8 pages.

* cited by examiner

*Primary Examiner* — Thjuan K Addy
(74) *Attorney, Agent, or Firm* — Merchant & Gould P.C.

(57) ABSTRACT

An acoustic system and method detect and locate low intensity and low frequency sound sources in an investigation area. An acoustic system is effective in identifying survivors trapped under rubble following a catastrophic event. The acoustic system focuses on the low frequency components of the human voice and includes acoustic sensors for detecting acoustic signals generated by the sound sources and for generating data representative of the acoustic signals. A wireless transmitter transmits the data representative of the detected acoustic signals to an electronic receiver block that receives and analyzes the data. A processor executes calibration of the acoustic sensors of the suite to temporally align each signal received from the acoustic sensors, and executes a digital beamforming to
(Continued)

combine the data representative of the detected acoustic signals and to create an acoustic image of the investigation area to locate the low intensity and low frequency sound sources.

15 Claims, 6 Drawing Sheets

(51) Int. Cl.
    *G01S 5/30*         (2006.01)
    *G01S 3/82*         (2006.01)
    *G10K 11/34*       (2006.01)
    *H04R 3/00*        (2006.01)

(58) Field of Classification Search
    USPC ......... 381/555, 150, 91, 111, 122, 164, 356, 381/339
    See application file for complete search history.

ACOUSTIC SYSTEM FOR DETECTING AND LOCATING LOW INTENSITY AND LOW FREQUENCY SOUND SOURCES AND RELATED LOCATING METHOD

This application is a National Stage Application of PCT/IB2019/052128, filed 15 Mar. 2019, which claims benefit of patent application Ser. No. 10/2018000004280, filed 6 Apr. 2018 in Italy and Patent Application Serial No. 10218000009569, filed 18 Oct. 2018, and which applications are incorporated herein by reference. To the extent appropriate, a claim of priority is made to each of the above-disclosed applications.

BACKGROUND ART OF THE INVENTION

Field of Application

The present invention relates to an acoustic system for detecting and locating low intensity and low frequency sound sources and to a related locating method.

The invention in particular meets the need to make available an acoustic system which is effective in identifying survivors trapped under the rubble of buildings following the occurrence of a disastrous event, e.g. an earthquake, in which the presence and the position of such trapped people may be detected by the requests for help thereof.

Prior Art

Many companies today propose commercial acoustic arrays or microphone arrays which can be used in the field of passive audio imaging. Among these, the following are worth noting: Norsonic, CAE Systems, Acoustic Camera, Dual Cam.

Such acoustic arrays allow the listening direction to be modified without physically moving the array itself by combining the signals received from the individual microphones for each direction involved. In particular, a sound power for generating an acoustic image which is placed over the optical image may be measured for each direction by means of scanning an optical image made available by an optional camcorder along the main directions of such an image.

An assembly comprising a microphone array and optionally a camera or digital camcorder is commonly called an "acoustic camera".

Commercially-used acoustic cameras of known type are characterized by a maximum aperture, i.e. by a maximum longitudinal dimension of about two meters. Such acoustic cameras are configured to sufficiently accurately locate a sound source having frequencies greater than 2 kHz.

There is a need to use acoustic cameras with broader aperture in order to accurately locate sound sources at lower frequencies, and in particular human voices. In particular, there is a need to use an acoustic camera with aperture of at least ten meters to detect a sound source having frequencies in the order of 300 Hz.

An acoustic network system called ACOUFIND can be used for detecting trapped people. Such an acoustic system is described in document: Menachem Friedman, Yoram Haddad, Alex Blekhman, "ACOUFIND: Acoustic Ad-Hoc Network System for Trapped Person Detection", IEEE International Conference on Microwaves, Communications, Antennas and Electronic Systems (COMCAS 2015), 2-4 Nov. 2015, Tel Aviv, Israel.

The ACOUFIND acoustic system consists of three main components:
a plurality of smartphones used as microphone sensors to record acoustic data in a specific known place;
a computer which collects acoustic data from all the smartphone recordings and then analyzes them by processing the digital signal to calculate the position of the survivor; and
a router which makes the connection between the smartphones and the central computer.

Such a system does not use a consistent acoustic array and the assessment of the originating direction of the sound source is obtained with triangulation techniques.

The need is particularly felt today to realize the acoustic detection and locating of weak sound sources, i.e. low intensity and amplitude and low frequency sound sources, in a preset area, in particular following the occurrence of a disastrous event in such an area, such as e.g. an earthquake.

As mentioned above, the solutions which can be used today for this purpose are represented by the acoustic cameras and by the ACOUFIND acoustic system.

However such known solutions have limits and drawbacks.

Indeed, the commercial acoustic cameras are inadequate for the above-indicated application due to the reduced aperture thereof (maximum of two meters). Such a reduced aperture causes a low angular resolution which makes such acoustic cameras incapable of locating, in a sufficiently accurate manner, the originating direction of low frequency acoustic signals, i.e. of acoustic signals having frequencies less than 1000 Hz.

The ACOUFIND acoustic system instead has the drawback that the ability to detect the sound source is limited by the sensitivity of the microphone installed on the smartphones.

SUMMARY OF THE INVENTION

It is the object of the present invention to devise and make available a deployable and reconfigurable lightweight acoustic system and a related method for detecting and locating low intensity and low frequency sound sources, which allows overcoming the above limitations in reference to the known solutions.

The invention makes available an acoustic system which preferably, but not exhaustively, can be used to find survivors under the rubble, for example of a building, following the occurrence of a disastrous event, e.g. an earthquake, in which the presence and the position of the trapped people may be detected on the basis of the requests for help thereof.

In greater detail, it is the object of the invention to make available an acoustic system for detecting and locating low intensity and low frequency sound sources having increased sensitivity to weak signals than what can be obtained with the single-microphone solution of ACOUFIND and furthermore, which can be configured to ensure an increased directional accuracy with respect to an acoustic camera of commercial type.

The invention proposed focuses on the low frequency components of the human voice, i.e. the components of the voice having frequency less than 1000 Hz. Such components of the voice indeed show increased energy content and are more resistant to the attenuation of the transmission means.

The acoustic system of the invention in particular implements a broader acoustic array than the known solutions, i.e. having aperture greater than 3 meters, preferably in the 10 to 20 meter range for optimal results, for specifically detecting the spectral components of the human voice with frequency less than 1000 Hz.

Moreover, the invention achieves a virtual acoustic camera because it is configured to temporally align the microphones, thus increasing the sensitivity.

The acoustic system of the invention results in an increased detection ability and locating accuracy with respect to the more modern sensors and acoustic systems while achieving an equivalent acoustic array having width greater than 3 meters, preferably width in the range of 10 to 20 meters for optimal results, and therefore by applying classical digital beamforming techniques.

Such beamforming techniques use algorithms for processing the acoustic signal which allow a receiver soundbeam to be formed by spatially isolating a sound originating from a given direction.

The specific application in environmental contexts such as those generated by the occurrence of a disastrous event, e.g. an earthquake, require the use of a lightweight solution which can easily be deployed and configured with respect to the environment. The system of the invention in particular does not need the sensors or microphones of the acoustic system to be arranged on a flat surface, rather allows a quick deployment of the microphones themselves, which is independent of the position thereof and does not affect the performance of the system. For this purpose, the acoustic system of the invention comprises an assembly of acoustic sensors or microphones configured to be located scattered in an area, which can be wirelessly connected to one another and arranged according to simple rules.

To cause such an assembly of sensors to become a true acoustic array, the invention advantageously provides the application of a calibration procedure adapted to estimate the related position of the sensors themselves with respect to a reference, and to save these positions as corrections to be applied in the listening step of the sound signals, in particular low intensity and low frequency sound signals.

BRIEF DESCRIPTION OF THE DRAWINGS

Further features and advantages of the acoustic system and of the method according to the invention will become apparent from the following description of preferred embodiments thereof, given only by way of non-limiting, indicative example, with reference to the accompanying drawings, in which.

Equal or similar elements are indicated with the same numerals in the aforesaid FIGS. 1 to 7.

DETAILED DESCRIPTION

Figure 1:
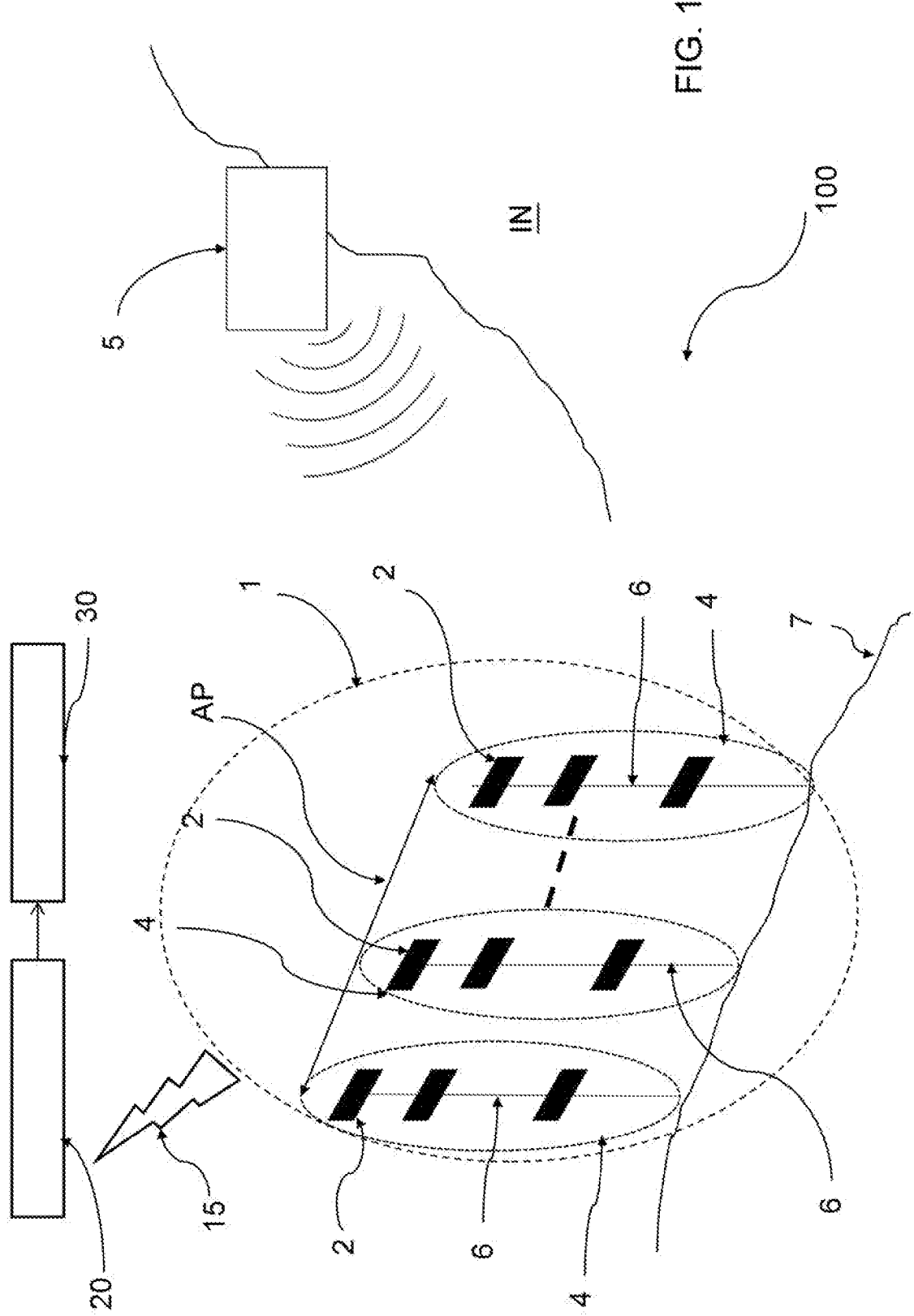
FIG. 1 diagrammatically shows an acoustic system for detecting and locating low intensity and low frequency sound sources according to the invention.
Figure 7:
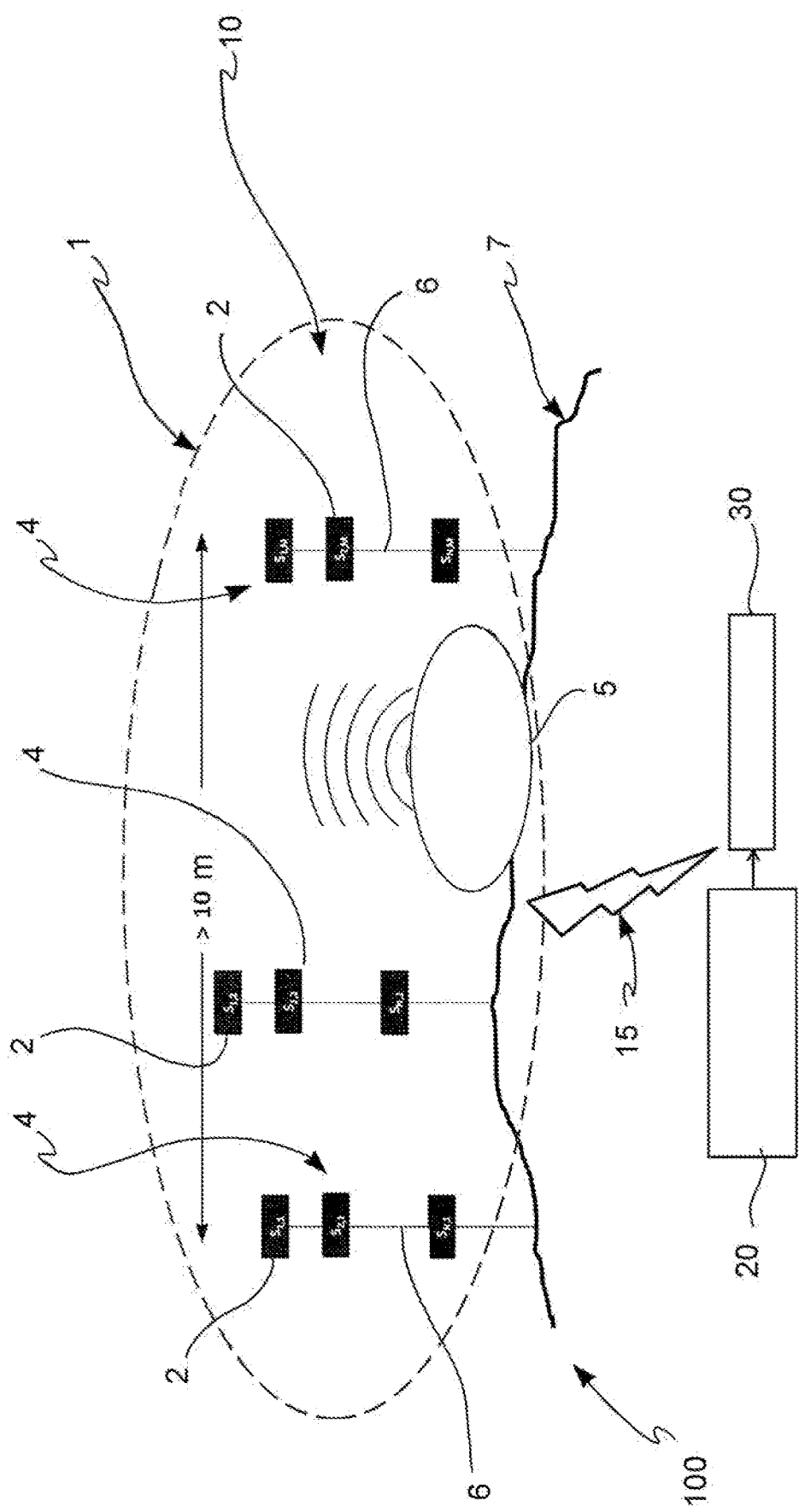
FIG. 7 shows a simplified image of the acoustic system for detecting and locating low intensity and low frequency sound sources in FIG. 1.

With reference to FIGS. 1 and 7, the acoustic system for detecting and locating low intensity and low frequency sound sources in an investigation area IN according to the invention, is indicated as a whole with numeral 100.

Such an acoustic system 100 comprises a suite 1 of acoustic sensors or receivers 2. Such a sensor suite 1 in particular comprises M groups 4 of sensors 2 distributed in an investigation area IN, in which the sensor suite 1 has a width or aperture AP.

Each sensor group 4 of the suite preferably, but not exhaustively, includes N acoustic sensors 2, for example N microphones vertically arranged along a common support 6, for example a microphone support connected to ground 7. Thereby, the acoustic system 100 comprises a suite 1 including M×N acoustic sensors 2.

The acoustic sensors 2 of the suite in particular may be randomly distributed in the investigation area IN to detect acoustic signals generated by the low intensity and frequency sound sources and to generate data representative of such acoustic signals. The acoustic sensors 2 of the suite practically are arranged arbitrarily in the investigation area IN, i.e. they are not bound to belonging to a specific surface or structure. The causal term related to the distribution of the acoustic sensors 2 of the suite in the present invention means that the sensors are distributed in a "suitable" manner, i.e. without being subjected to a specific rule or obligation, but so as to follow the needs of the end user, without however geometric type limits or obligations. This increases the flexibility of use of the acoustic system 100 of the invention.

Width or aperture of suite 1 of acoustic sensors 2 later in this description means the distance as the crow flies between the two groups 4 of sensors 2 the furthest from each other.

Moreover, the groups 4 of sensors 2 of suite 1 are not necessarily aligned on ground 7 along the same direction, as shown in FIG. 1, but they may be randomly distributed in the investigation area IN. In any case, such sensor groups 4 are positioned within a sphere having a diameter which is equal to the aforesaid width or aperture AP of the sensor suite 1.

In one example embodiment, such a width or aperture AP of suite 1 of sensors 2 is greater than 3 meters. In a preferred example embodiment, such a width or aperture AP of the sensor suite 1 is in the range of 10 to 20 meters for optimal results.

In other words, the number of microphones 2 used being equal, system 100 of the invention allows a plurality of various configurations to be achieved by simply deploying the microphones 2 according to different layouts of the suite, each of which has a respective aperture AP. On the basis of simulations and experimental tests, the Applicant has seen that system 100 ensures an increased sensitivity to various parts of the acoustic spectrum with the above-mentioned apertures AP of suite 1 of sensors 2.

Moreover, the acoustic system 100 comprises an electronic calibration apparatus 5, i.e. an apparatus operating as sound source and configured to calibrate suite 1 of the acoustic sensors.

Indeed, in order to quickly distribute the acoustic sensors 2 of the acoustic system 100 in the investigation area IN, such acoustic sensors 2 may be positioned according to an approximate "practical rule". In reference to the example in FIG. 1, it is provided for the distance between the two groups 4 of sensors 2 furthest from each other to be AP=10 and for the remaining groups 4 of sensors 2 to be more or less uniformly positioned in intermediate position between such furthest groups of sensors.

It is worth noting that the low intensity and low frequency sound source for the objects of the present invention is the human voice having frequency components less than 1000 Hz.

The acoustic system 100 further comprises wireless communication means 15, in particular a wireless link, to allow a wireless type communication between suite 1 of sensors 2 and the electronic calibration apparatus 5 on the one hand, and an electronic receiver block 20, in particular a multi-channel block, and a processing unit 30 of the acoustic system 100 on the other hand.

In greater detail, through the aforesaid wireless link 15, the acoustic system 100 is configured to:
  enable the transmission of data acquired by suite 1 of sensors 2, to the multi-channel receiver block 20;
  execute a control and time alignment of the sensors 2 of the suite.

The above-mentioned multi-channel electronic receiver block 20 is configured to receive and analyze the data representative of the detected acoustic signals. Such a multi-channel receiver block 20 in particular comprises a wireless multilink and a processing block, both made using standard hardware components. The multi-channel receiver block 20 further comprises software components configured to collect data representative of acoustic signals acquired by suite 1 of acoustic sensors 2 and to sample such signals.

The acoustic system 100 further comprises the above-mentioned processing unit 30 operatively associated with the multi-channel electronic receiver block 20. Such a processing unit 30, which for example materializes in a personal computer (PC), is configured to execute in sequence:
  an operation of "calibrating and controlling" acoustic sensors 2 of suite 1 to temporally align the acoustic signals received from the acoustic sensors 2 randomly distributed in said investigation area IN,
  an operation of "digital beamforming" to combine the data representative of the acoustic signals detected by the acoustic sensors 2 and to create an acoustic image of the investigation area to locate said low intensity and low frequency sound sources.

Indeed, to cause the above-mentioned assembly of sensors 2 to become a true acoustic array, the aforesaid electronic calibration apparatus 5, which is operatively associated with the processing unit 30, is configured to emit suitable sound waveforms on the basis of indications and instructions imparted by the processing unit 30 itself.

The execution of an appropriate calibration procedure by the processing unit 30 allows the related position between each sensor 2 of array 1 to be estimated in the three-dimensional space 3D (x, y, z).

The processing unit 30 in particular is adapted, through the "calibration and control" operations, to manage the calibration procedure and to process the data acquired by suite 1 of sensors 2 when they are stimulated by the calibration apparatus 5, as is clarified below.

The acoustic system 100 requires for the aforesaid calibration operation to be executed at least once following the deployment of suite 1 of sensors 2 in the investigation area IN.

Following such a calibration operation, the acoustic system 100 is configured to use beamforming techniques, which are known to an expert in the field, on the sound signals detected by the acoustic array 1.

Figure 2:
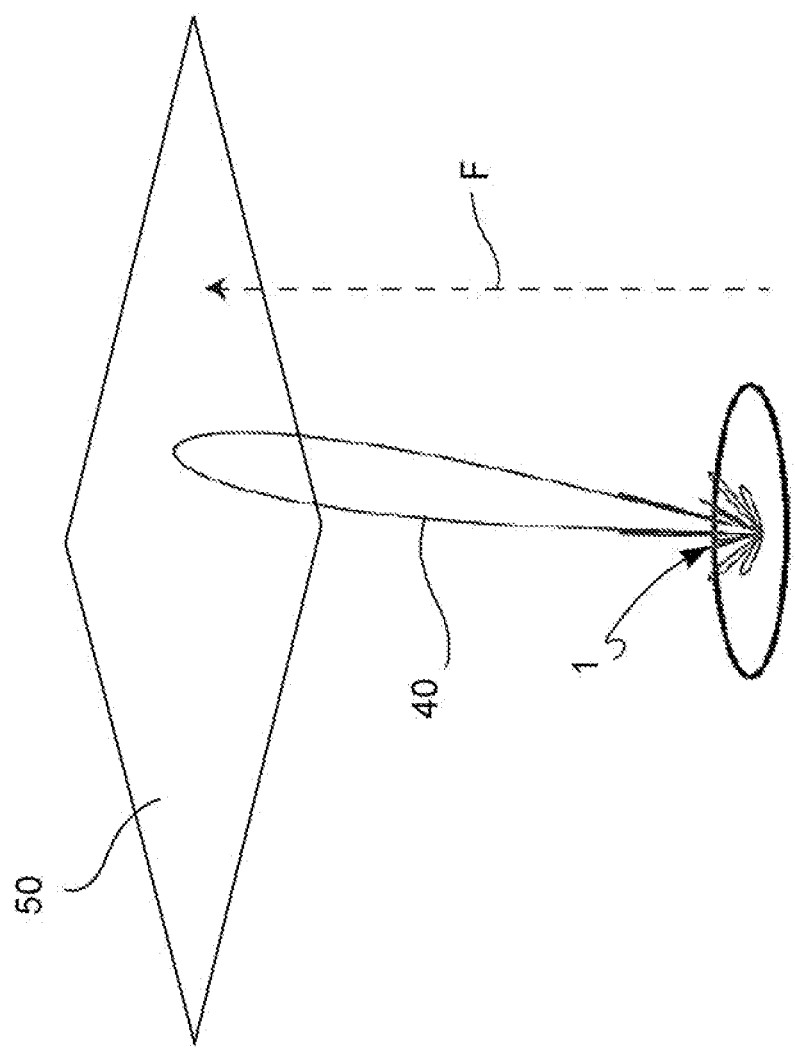
FIG. 2 graphically shows an example of formation of a passive audio receiver beam with respect to a rectangular scene.

The processing unit 30 is adapted, through such "digital beamforming" operations, to implement the passive audio imaging by forming receiver beams (as shown in FIG. 2) for all the directions involved through a single acquisition of sound signals.

In greater detail, such a FIG. 2 diagrammatically shows the acoustic array 1, which distance from the scanning plane 50 is indicated by an arrow F, and a beam model 40 emitted by such an acoustic array 1.

An example embodiment of a calibration method executed by the acoustic system 100 for detecting and locating low intensity and low frequency sound sources proposed is described below in reference to FIGS. 3A, 3B 4, 5 and 6.

As is known, calibration is an operation which becomes necessary in order to apply the classical beamforming algorithms, e.g. "data independent" algorithms, on an array of acoustic sensors or receivers 2 randomly positioned in an investigation area, such as the acoustic array 1 in FIG. 1.

In particular, when an assembly of sensors 2 is arranged to form an array, there is a need to know the geometry of the array, i.e. the related position of each sensor of the array with respect to the others.

In the case of acoustic camera, the microphones of the array are positioned on a frame to form a rigid structure having substantially planar shape. Therefore, the position of each sensor in the array is known beforehand.

In the case instead of a layout of the microphones 2 over an investigation area IN, such microphones 2 in general are arranged randomly with respect to a reference plane according to the specificity of the environment observed and the type of information to be received.

Figure 3A:
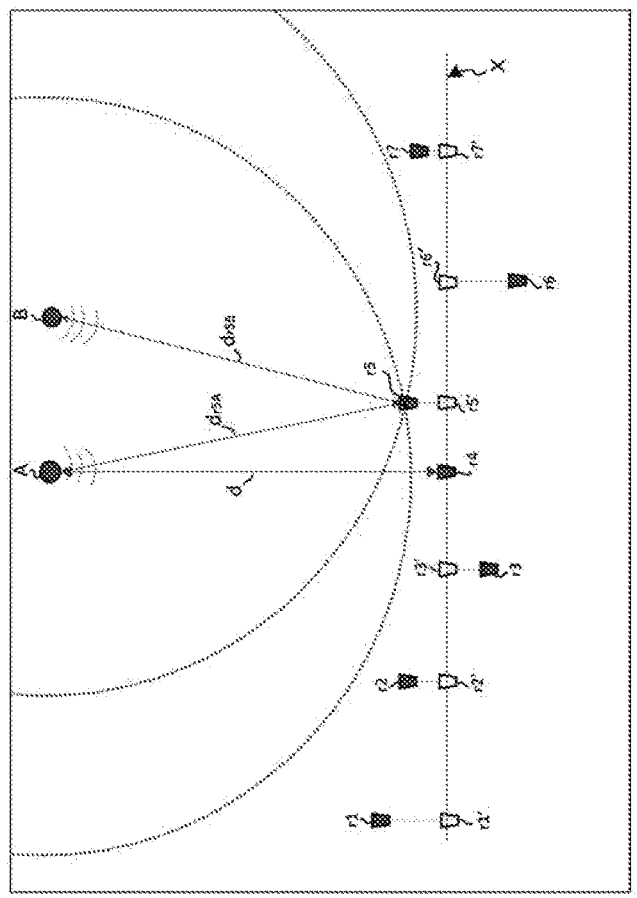
FIGS. 3A to 3B graphically show steps of a known calibration method which can be used in a linear acoustic array.

In general terms, according to a known calibration method referring to a bi-dimensional array, in particular a linear array like the one shown by way of example in FIG. 3A, it is assumed that one of the sensors or receivers, e.g. sensor r4, is the reference sensor (or pivot sensor). A first sound source A is arranged at a known distance d from a straight line X which crosses such a reference sensor r4 and is orthogonal to the segment having the same reference sensor r4 and the first source A as ends.

The secondary sensors r1, r2, r3, r5, r6, 5 r7 of the array are spatially spaced apart from the straight line X.

As is known, the object of the calibration procedure is to measure the positions of these secondary sensors r1, r2, r3, r5, r6, r7 in the reference system A-r4-X defined by the first source A, by the reference sensor r4 and by the straight line X, and to estimate the corrections to be applied to each of such secondary sensors in terms of positive or negative time delay to be applied to the detected sound signals to simulate an aligned array.

Again with reference to FIG. 3A, a second sound source B is considered for this purpose in addition to the first sound source A and to the reference sensor r4. The position of one of the secondary sensors in the reference system A-r4-X, e.g. secondary sensor r5, is obtained by measuring a first dr5A and a second dr5B distance of such a secondary sensor r5 from the first A and from the second B sound source, respectively.

The procedure then provides calculating the equations of two circumferences C1, C2 with middle in the position of the first A and of the second B sound source and having the first dr5A and the second dr5B distance, respectively, as radius. The position of the secondary sensor r5 is obtained by intersecting the equations of the aforesaid circumferences C1 and C2.

Once the position of the secondary sensor r5 is known the calibration procedure provides a step of calculating a time shift Δt5 representative of the spatial distance between the position of the secondary sensor r5 and the projection r5 of the position of such a sensor orthogonal to the straight line X in order to align all the elements of the array.

Figure 3B:
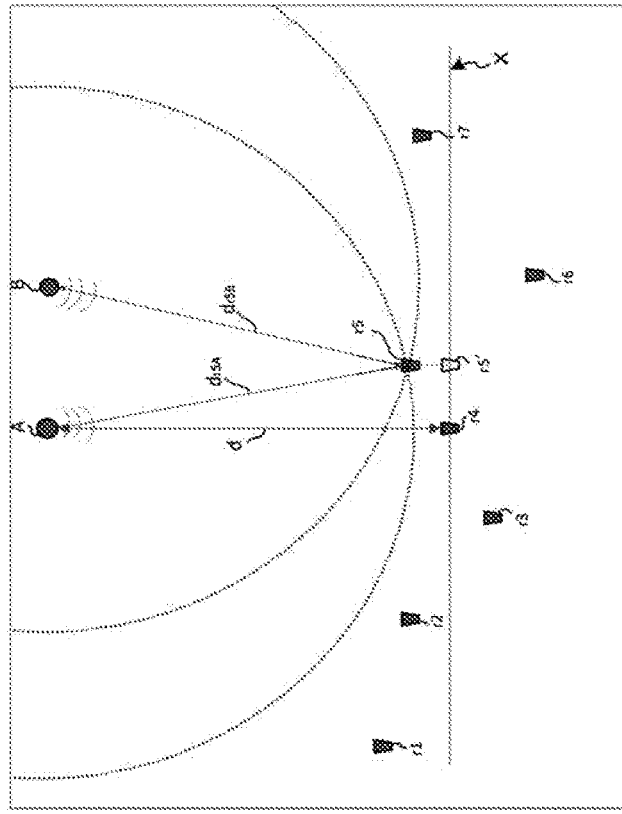

In reference to FIG. 3B, by repeating the aforesaid operations for all the secondary sensors of the linear array r1, r2, r3, r5, r6, r7, a first time shift vector (Δt1, Δt2, ..., Δt7) and a second vector may be calculated, in which each element is representative of the difference between the actual position of the aforesaid secondary sensors r1, r2, r3, r5, r6, r7 and the position of such sensors aligned (along a straight line X) with the reference sensor r4, i.e. vector Δx1, Δx2, ..., Δx7. Each time shift of the first vector (Δt1, Δt2, ..., Δt7) is representative of the greater or lesser distance of the secondary sensors r1, r2, r3, r5, r6, r7 from the alignment condition.

The above-described process for linear array may be extended to an actual case, i.e. to an array distributed in a three-dimensional space, such as array 1 in FIG. 1. The process here provides the use of three sound calibration sources.

The position in space of each sensor 2 of the acoustic array 1 can be obtained by measuring the three distances between a preselected reference acoustic sensor (pivot sensor) and each of these three sound calibration sources. Moreover, the intersecting point of three spheres is calculated, each having middle at one of the aforesaid sound sources and the three distances measured as radius.

Looking in greater detail at the calibration method implemented in the acoustic system 100 of the present invention, the same acoustic waves are used to measure the distances between the aforesaid three sound calibration sources and the sensors or microphones 2 of suite 1.

Once the speed of the sound in the air is known, a same waveform emitted by a sound source is received at various distances at various times. Therefore, the measurement of the time shift is proportional to the measurement of the distance of the various sensors 2 of array 1 from the reference sensor.

In order to increase the accuracy in measuring the distance, the calibration method of the invention provides using test signals having waveforms modulated in "chirp" type frequency, i.e. signals in which the frequency varies linearly over time by increasing or decreasing.

Figure 4:
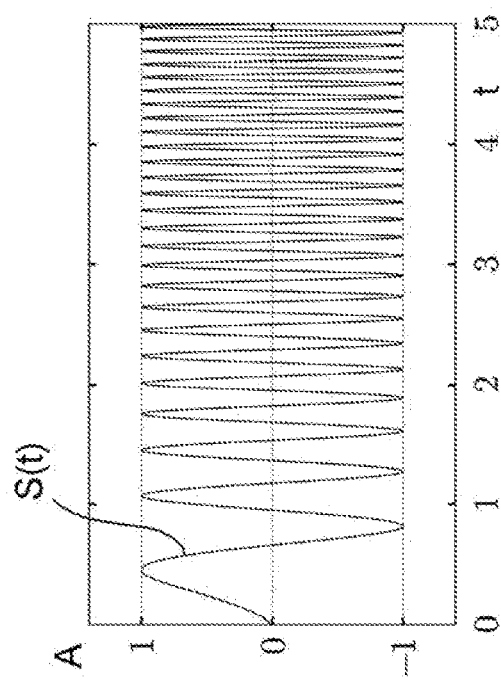
FIG. 4 shows, according to time, an example of test signal which can be used, in a calibration method, by the acoustic system for detecting and locating low intensity and low frequency sound sources in FIG. 1.

An example of test signal (S(t)) which can be used in the calibration method of the invention is shown in FIG. 4.

Such a test signal (S(t)), in particular an increasing frequency signal, can be expressed by means of the equation:

$$s(t) = \cos\left[2\pi\left(f_0 t + \frac{Kt^2}{2}\right)\right] \text{ with} \quad (1)$$

$$|t| \leq \frac{T}{2} \text{ and } B = KT$$

where T is the duration of the modulated pulse and B is the frequency range of such a pulse. The use of the aforesaid frequency modulating waveforms (S(t)) increases the calibration accuracy.

At least one of such test signals (S(t)) is emitted by each of the three sound calibration sources and is received by all the microphones 2 of system 100. The three sound calibration sources in particular are located in the calibration apparatus 5.

During calibration, the test signal (S(t)) is emitted in sequence by each of these three calibration sources with a preset transmission time interval with respect to the same signal emitted by one of the other two sources. Such a transmission time interval is for example, greater than duration T of the modulated pulse.

The method provides a step in which the test signals (S(t)) emitted by the three calibration sources and received by each microphone 2 of array 1 are digitalized to generate respective digital signals Sd to be sent to the processing unit 30.

The method in such a processing unit 30 provides a step of executing a convolution operation between each digital signal Sd received with a copy of the test signal (S(t)), which is saved in a respective memory of the processing unit 30.

Figure 5:
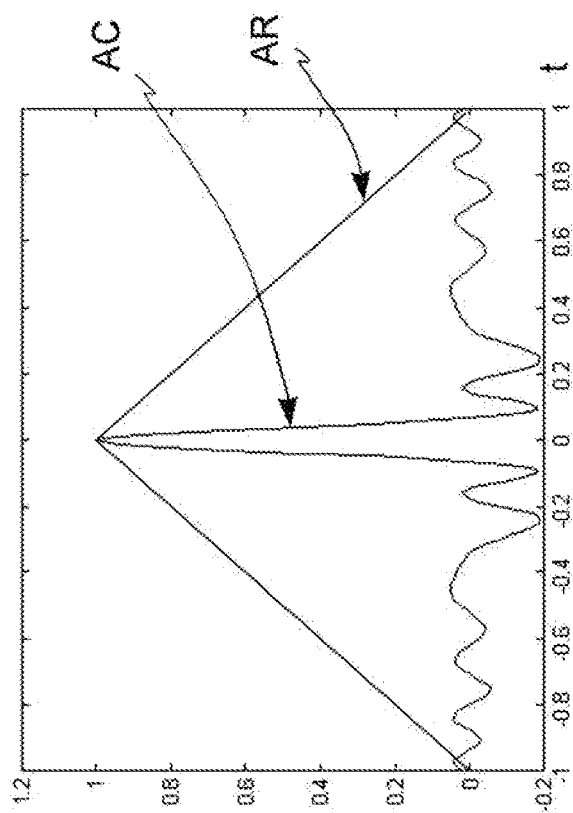
FIG. 5 shows an autocorrelation signal generated from the test signal in FIG. 4, compared with a further autocorrelation signal obtained from a rectangular signal.

Such a convolution operation generates an autocorrelation signal AC similar to the one shown in FIG. 5. Such a FIG. 5 in particular shows an example of autocorrelation signal AC compared with a further autocorrelation signal AR obtained from a rectangular signal.

With reference to FIG. 5, it is worth noting that the width of the main loop a −3 dB of the autocorrelation signal AC obtained from the test signal (S(t)) is inversely proportional to the bandwidth B of such a signal.

Moreover, if the same test signal (S(t)) received from the sensors 2 originates from a first and a second sound calibration source arranged at a distance d1 from each other, the processing unit 30 is configured to generate a first AC1 and a second AC2 autocorrelation signal having a time shift from each other which is directly proportional to distance d1 between such sources. In greater detail, such a time shift is equal to the ratio d1/vs, where vs is the speed of the sound.

Figure 6:
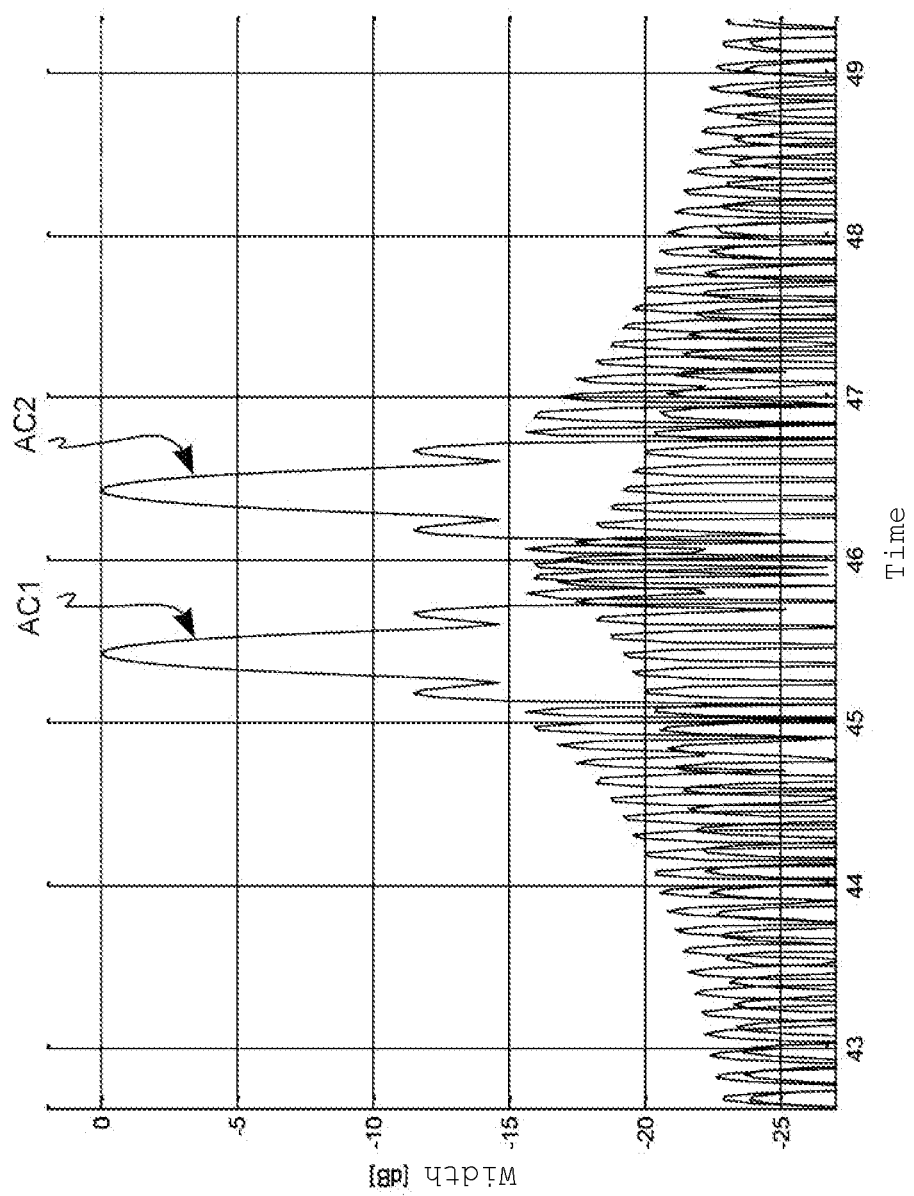
FIG. 6 shows a first and second autocorrelation signal generated from a same test signal in FIG. 4, modulated in band frequency B=10 kHz and emitted by two separate sound sources.

By way of example, FIG. 6 shows the first AC1 and the second AC2 autocorrelation signal generated from a same test signal (S(t)), modulated in band frequency B=10 kHz and emitted by two separate sound calibration sources arranged at a distance from each other of d1=30 cm. In reference to the example in FIG. 6, the peak portions of the autocorrelation functions AC1 and AC2 are spaced apart from one another by about one millisecond. The width of the main loop of the autocorrelation at −3 dB for the aforesaid functions (obtained by intersecting the loop with a horizontal straight line passing through −3 dB) is equal to about 0.1 milliseconds, corresponding to about 3 cm.

The peak position of the functions may therefore be estimated with an accuracy equal to at least $3/\sqrt{12}$, which is sufficient for the application proposed.

Such a procedure, which is repeated for the signals emitted by the three calibration sources and for each microphone 2 of array 1, allows the processing unit 30 to collect the estimated distances between the peaks of the related autocorrelation functions to generate a correction matrix.

The elements of the aforesaid correction matrix are representative of the correction to be applied to each microphone 2 and to the related receiver channel prior to the beamforming step. In greater detail, such corrections are applied to the low intensity and low frequency sound signals received and sampled by each receiver channel of the microphones 2, and can be expressed as positive or negative time shift of samples of such signals.

In other words, the calibration of the acoustic sensors 2 of suite 1 comprises the following steps:
emitting in sequence, at preset time intervals, at least one calibration test signal (S(t)) by the three sound calibration sources of the electronic calibration apparatus 5;

receiving, by any one of the acoustic sensors 2 of suite 1, the three test signals S(t) originating from each of said sound sources to generate three digital signals Sd to be sent to the processing unit 30;

executing, by the processing unit 30, a convolution between each of the three digital signals Sd received with a copy of the test signal S(t) emitted to generate three autocorrelation signals AC;

calculating, from a known distance d1 between the sound calibration sources, a respective distance between the portions at −3 db of the three autocorrelation signals to estimate a time shift between the samples of the received test signals S(t);

repeating said execution and calculation steps for each acoustic sensor 2 of suite 1, and generating, by the processing unit 30, a correction matrix which elements are representative of corrections in the time shift applicable to the samples of the signals emitted by low intensity and low frequency sound sources received from each acoustic sensor 2 of the suite 1.

The acoustic system 100 of the invention is configured, under operating conditions, to implement and execute digital beamforming algorithms to stimulate a scanning of all the possible receiver directions of a sound signal in order to detect and locate low intensity and low frequency sound sources, such as for example, voices or calls emitted by a individuals trapped under the rubble of buildings following the occurrence of a disastrous event, such as an earthquake.

As is known, the term beamforming is used to indicate a variety of processing algorithms of the signals received by the microphones 2 of an acoustic array 1 so that the latter focuses on and faces a particular direction without any intervention being carried out on the structure of array 1 or on the number or on the layout of the microphones 2 of the array.

In particular, beamforming consists of a spatial filtering applicable to an array of elements, in the case under examination, microphones of an acoustic array, in light of the (spatial) diversity of the signals received from each thereof.

According to the criteria with which the coefficients characterizing the aforesaid spatial filter are calculated, the beamforming algorithms may be broken down into:

data-independent algorithms;

excellent algorithms from a statistical viewpoint.

The coefficients in data-independent algorithms do not depend on the data and are selected so that the response of the beamformer approximates a desired response known beforehand.

All the examples of beamforming algorithms described below advantageously can be implemented by the acoustic system 100 of the invention.

Among the data-independent algorithms, one of the most common and sound solutions is the Bartlett beamformer, or delay-and-sum (DAS) beamforming. In greater detail, the DAS beamforming algorithm is configured to apply a delay and an amplitude weight to the signal received from each element of the array, to then add all the contributions thus processed. The delays are selected so as to maximum the sensitivity of the array to the emissions originating from a particular direction. Indeed, the suitable adjustment of the delays allows the signals collected by the individual elements of the array to be constructively added, in fact pointing the array in the direction of a specific source. Further details on the DAS beamforming algorithm are described in the document found at the link:

http://www.labbookpages.co.uk/audio/beamforming/delay-Sum.html

The coefficients of the spatial filter in the excellent algorithms from a statistical viewpoint are selected according to the statistics of the received data. The output provided by such algorithms also contains a contribution—albeit minimum—due to the interfering signals and to the noise. These are adaptative algorithms, designed so the response converges with a statistically excellent solution.

The Minimum Variance Distortionless Response (MVDR) is worth noting among the algorithms of this second category. Such an MVDR algorithm is adapted to minimize the variance of the outlet signal with linear pointing constraint. The signals received from the elements of the array in particular are used to calculate the spatial coefficients in order to mitigate the effect of the noise and of the interferences. Further details on the MVDR algorithm are described in the document found at the link:

https://www.med.ira.inaf.it/Medichats/29_01_2008/Medichat_29.01.2008.ppt

In the specific case in which the geometry of the array is not fixed or known, such as in the acoustic system 100 of the invention, the calibration operations may be particularly burdensome from a computational viewpoint due to a random distribution of the constituting elements. "Blind beamforming" algorithms may be used in these cases, which exclusively use data collected by the elements of the array to focus and direct the latter towards a particular direction. An example of beamforming algorithm comprising three randomly distributed sensors is described in document YAO et al.: Blind Beamforming on a Randomly Distributed Sensor Array System, IEEE JOURNAL ON 15 SELECTED AREAS IN COMMUNICATIONS, VOL. 16, NO. 8, OCTOBER 1998).

The advantages of the blind beamforming lie in the possibility of ignoring both the radiation diagram of the elements of the array and the insensitivity to the calibration errors.

On the basis of what is disclosed above, it may be concluded that the acoustic system 100 for detecting and locating low intensity and low frequency sound sources of the invention and the related method are provided with advanced functionalities for detecting the acoustic sources and accuracy functionalities in locating persons, while simultaneously ensuring implementation speed, flexibility and simplicity.

With respect to the known solutions, the acoustic system 100 of the invention in particular includes the following innovative aspects:

digital beamforming techniques and algorithms in the "far field" to combine the data representative of the acoustic signals detected by the acoustic sensors 2;

creation of an acoustic image obtained by modifying the listening direction of the acoustic array 1 and then interpolating the power measured by each point of the scanning plane 50; the acquired data set for each direction of the area involved 50 in particular is processed to obtain the effect of a direction microphone pointed in the generic direction;

use of acoustic sensors 2 having superior sensitivity features with respect to the microphones currently used in other applications, for example in smartphones.

Moreover, the acoustic system 100 of the invention advantageously:

realizes an acoustic array 1 having a broader aperture than the one of the known solutions, in particular greater than 3 meters, preferably in the range of 10-to 20 meters for excellent results;

allows flexibility both in the dimensions and in the layout of the microphone array, thus ensuring optimized performance with respect to the environment observed;

ensures a quick layout of the acoustic sensors 2, given the possibility of arranging the same substantially in random manner.

The acoustic system 100 of the invention has the following advantages:

ensures improved locating sensitivity and accuracy with respect to the devices currently available;

quick and simple and flexible implementation, which is a significant requirement if trapped survivors are to be located under the rubble of buildings following the occurrence of a disastrous event, e.g. an earthquake;

a system which can be reconfigured in terms of dimensions and layout of the elements, and which may also be positioned at a safety distance from the area observed;

use of the acoustic technology as effective complement to radar or seismic systems.

For example, radar detection systems suffer from noises originating from small movements around the analyzed site (water flow, crowd movement, etc.) which may cause false alarms and problems of electromagnetic interference (including the cellular base stations).

Seismic systems suffer from noise caused by the vibrations of vehicles, machinery or persons and have limited accuracy.

Contrarily, the aforesaid limits are overcome with the present invention. The overall detection capacity of system 100 is improved by the combination of the acquired signals originating from the acoustic sensors 2 through digital beamforming techniques which increase the sensitivity of system 15 with respect to the individual microphones 2 associated with array 1. In other words, the survivors who carry out calls of weak intensity and/or furthest from array 1 may in any case be detected with the acoustic system 100. Moreover, system 100 of the invention is adapted to create a virtual acoustic camera by creating an acoustic image of a given site which may be placed over the optical image provided by an (optional) camcorder.

Those skilled in the art may make several changes and adaptations to the embodiments of the system and method of the invention, and may replace elements with others which are functionally equivalent in order to meet contingent needs, without departing from the scope of the following claims. Each of the features described as belonging to a possible embodiment may be achieved regardless of the other embodiments described.

The invention claimed is:

1. An acoustic system (100) for detecting and locating low intensity and low frequency sound sources in an investigation area (IN), comprising:

a suite (1) of acoustic sensors (2) to detect acoustic signals generated by said sound sources and to generate data representative of said acoustic signals;

an electronic receiver block (20) configured to receive and analyze the data representative of the detected acoustic signals;

wireless communication means (15) for transmitting said data representative of the acoustic signals detected by the acoustic sensors (2) to the electronic receiver block (20);

a processing unit (30) operatively associated with the electronic receiver block (20), said processing unit (30) being configured to execute in sequence:

an operation of calibrating the acoustic sensors (2) of the suite (1) to temporally align the acoustic signals received from the acoustic sensors (2), an operation of digital beamforming to combine the data representative of the acoustic signals detected by the acoustic sensors (2) and to create an acoustic image of the investigation area to locate said low intensity and low frequency sound sources, characterized in that the suite (1) of acoustic sensors comprises more than one group (4) of acoustic sensors (2), each group (4) of sensors including a plurality of acoustic sensors (2) linearly arranged along a common support (6).

2. An acoustic system (100) according to claim 1, further comprising an electronic apparatus (5) for calibrating acoustic sensors (2), connected to said processing unit (30) through the wireless communication means (15) to receive start instructions of said calibration operation.

3. An acoustic system (100) according to claim 1, wherein the suite (1) of acoustic sensors (2) is configured so that a distance as the crow flies between the two groups (4) of acoustic sensors (2) the furthest from each other is comprised in the range of 10 meters to 20 meters.

4. An acoustic system (100) according to claim 3, wherein said groups (4) of acoustic sensors (2) of the suite (1) are positioned within a sphere having a diameter which is equal to said distance comprised in the range of 10 meters to 20 meters.

5. An acoustic system (100) according to claim 2, wherein said electronic calibration apparatus (5) is configured to emit, on the basis of the start instructions received from the processing unit (30), at least one calibration test signal (S(t)) having a waveform with linearly variable frequency over time.

6. An acoustic system (100) according to claim 5, wherein said at least one calibration test signal (S(t)) has a linearly increasing frequency over time.

7. An acoustic system (100) according to claim 5 or 6, wherein said electronic calibration apparatus (5) includes three sound calibration sources, each of which is configured to emit said at least one calibration test signal (S(t)).

8. An acoustic system (100) according to any one of the preceding claims, wherein said acoustic sensors (2) are microphones.

9. An acoustic system (100) according to any one of the preceding claims, wherein the low intensity and low frequency sound source is the human voice having frequency components less than 1000 Hz.

10. A method for detecting and locating low intensity and low frequency sound sources in an investigation area (IN) by using an acoustic system (100) which comprises:

a suite (1) of acoustic sensors (2), said suite (1) comprising more than one group (4) of acoustic sensors (2), each group (4) of sensors including a plurality of acoustic sensors (2) linearly arranged along a common support (6), an electronic receiver block (20), wireless communication means (15), a processing unit (30) operatively associated with the electronic receiver block (20), the method comprising the steps of:
executing, by the processing unit (30), an operation of calibrating the acoustic sensors (2) of the suite (1) to temporally align each acoustic signal received from the acoustic sensors (2);
detecting, by the acoustic sensors (2), acoustic signals generated by said sound sources and for generating data representative of said acoustic signals;
transmitting, by the wireless communication means (15), said data representative of the acoustic signals detected by the acoustic sensors (2), to the electronic receiver block (20);
receiving and analyzing, by the electronic receiver block (20), the data representative of the detected acoustic signals;
executing, by the processing unit (30), a digital beamforming to combine the data representative of the acoustic signals detected by the acoustic sensors (2) and to create an acoustic image of the investigation area to locate said low intensity and low frequency sound sources.

11. A method for detecting and locating low intensity and low frequency sound sources in an investigation area (IN) according to claim 10, wherein the acoustic system further comprises an electronic apparatus (5) for calibrating acoustic sensors (2), connected to said processing unit (30) through the wireless communication means (15), said step of executing a calibration of the acoustic sensors (2) of the suite (1) comprises a step of emitting, by the electronic calibration apparatus (5), at least one calibration test signal (S(t)) having a waveform with linearly variable frequency over time.

12. A method for detecting and locating low intensity and low frequency sound sources in an investigation area (IN) according to claim 11, wherein said at least one calibration test signal (S(t)) has a linearly increasing frequency over time.

13. A method for detecting and locating low intensity and low frequency sound sources in an investigation area (IN) according to claim 11, wherein said step of executing a calibration of the acoustic sensors (2) of the suite (1) further comprises the steps of:
emitting in sequence, by three sound calibration sources of the electronic calibration apparatus (5), said at least one calibration test signal (S(t)) at preset time intervals;
receiving, by any one of the acoustic sensors (2) of suite (1), the three test signals (S(t)) originating from each of said sound sources to generate three digital signals (Sd) to be sent to the processing unit (30);
executing, by the processing unit (30), a convolution between each of the three digital signals (Sd) received with a copy of the test signal (S(t)) emitted to generate three autocorrelation signals (AC);
calculating, from a known distance (d1) between the sound calibration sources, a respective distance between the portions at −3 db of the three autocorrelation signals to estimate a time shift between the samples of the received test signals (S(t));
repeating said execution and calculation steps for each acoustic sensor (2) of the suite (1), and
generating, by the processing unit (30), a correction matrix which elements are representative of corrections in the time shift applicable to the samples of the signals emitted by low intensity and low frequency sound sources received from each acoustic sensor (2) of the suite (1).

14. A method for detecting and locating low intensity and low frequency sound sources in an investigation area (IN) according to claim 11, wherein the low intensity and low frequency sound source is the human voice having frequency components less than 1000 Hz.

15. A method for detecting and locating low intensity and low frequency sound sources in an investigation area (IN) according to claim 11, wherein the suite (1) of acoustic sensors (2) is configured so that a distance as the crow flies between the two groups (4) of acoustic sensors (2) the furthest from each other is comprised in the range of 10 meters to 20 meters.

\* \* \* \* \*